United States Patent Office 3,819,768
Patented June 25, 1974

3,819,768
GOLF BALL COVER COMPOSITIONS COMPRISING A MIXTURE OF IONOMER RESINS
Robert P. Molitor, South Hadley, Mass., assignor to Questor Corp.
No Drawing. Filed Feb. 11, 1972, Ser. No. 225,663
Int. Cl. C08f 37/18
U.S. Cl. 260—897 B
8 Claims

ABSTRACT OF THE DISCLOSURE

The subject application relates to golf balls having cover compositions which result in balls having superior cold cracking properties, superior coefficients of restitution, superior durability and better aging characteristics. The cover compositions of the subject invention can be utilized in conjunction with golf balls which have solid or wound cores. The golf ball cover compositions of the subject invention generally comprise mixtures of ionic copolymers of olefins and unsaturated monocarboxylic acid salts, such as a mixture of sodium and zinc salts of said copolymers.

BACKGROUND OF THE INVENTION

Golf balls having cover compositions which generally comprise a copolymer of an olefin and at least one unsaturated monocarboxylic acid are known in the prior art. These cover material compositions are sold under the trademark "Surlyn" by the E. I. du Pont de Nemours Company, Wilmington, Del. The cover compositions are highly advantageous in that the resulting covers are extremely cut and abrasion resistant. These balls are commonly referred to in golfing circles as cutless balls. The balls in question have achieved wide spread consumer acceptance on a world wide basis. These prior art golf balls are generally described in U.S. Pat. No. 3,454,280, issued on July 8, 1969.

While being extremely advantageous from a cut resistance point of view, the golf balls as described in U.S. Pat. No. 3,454,280 have a shortcoming in that they do not have cold temperature cracking properties such as to permit their usage in below freezing temperatures. In fact, when the balls of the prior art are played at temperatures below 32° F. they have a tendency to crack or explode when struck by a golf club. Likewise, the balls of this patent are lacking in their coefficient of restitution. It is to be noted the coefficient of restitution can be directly related to the distance which a golf ball can be driven.

The subject invention relates to improved cover compositions which have superior cold cracking properties such that the balls can be played at temperatures below 32° F. Likewise, the golf balls of the subject invention have superior coefficient of restitution properties, superior durability and aging characteristics.

DESCRIPTION OF THE PREFERRED EMBODIMENT

The subject invention is concerned with a golf ball which incorporates a superior cover composition. The invention specifically relates to the composition of the cover material. In its broad aspects the cover material of the invention comprises a mixture of at least two different ionic copolymers which are produced by the reaction of an olefin having from two to five carbon atoms with a metal salt of an unsaturated carboxylic acid containing from three to eight carbon atoms.

In another broad aspect the cover material of the subject invention comprises a mixture of copolymers comprising a copolymer of an olefin and a sodium salt of an unsaturated monocarboxylic acid containing from about three to about eight carbon atoms and a copolymer of olefin and a zinc salt of an unsaturated monocarboxylic acid containing from about three to about eight carbon atoms.

As was discussed above, the subject invention generally relates to a mixture of sodium and zinc salts of carboxylic acids wherein said metal salts are utilized to form copolymers with an olefin nucleus. In this connection the subject invention can utilize copolymers wherein the olefin nucleus has from about two to about five carbon atoms.

Copolymers for use in accordance with the subject invention are further illustrated in accordance with Formulas 1, 2 and 3 below.

Formula 1

$$-\left(R_1-\underset{\ominus}{R_2}\right)_n-M^{\oplus} \text{ or } H^{\oplus}$$

wherein $R_1$ is an olefin nucleus having from two to five carbon atoms, and; $R_2$ is an unsaturated carboxylic acid having from three to eight carbon atoms.

The ratio of $R_1$ to $R_2$ can be varied, however, it is preferred that $R_1$ constitute about 90 percent and $R_2$ constitute about 10 percent.

$n$ is an integer such that a high molecular weight copolymer is produced.

M is a member selected from the group consisting of metal ions of Group I, II, III, IV-A and VIII of the Periodic Table, and more preferably a member selected from the group consisting of monovalent metal ions $Na^+$, $K$, $Li^+$, $Cs^+$, $Ag^+$, $Hg^+$ and $Cu^+$; divalent metal ions $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{2+}$ and $Zn^{+2}$; trivalent metal ions $Al^{+3}$, $Se^{+3}$, $Fe^{+3}$ and $Y^{+3}$. A complete list of metal ions for use in this invention is contained in U.S. Pat. 3,264,272, issued August 2, 1966.

Formula 2

$$-\left(R_1-\underset{\ominus}{R_2}\right)_n-Na^{\oplus} \text{ or } H^{\oplus}$$

wherein $R_1$ is an olefin nucleus having from two to five carbon atoms, and; $R_2$ is an unsaturated monocarboxylic acid having from three to eight carbon atoms.

The ratio of $R_1$ to $R_2$ can be varied, however, it is preferred that $R_1$ constitute about 90 percent and $R_2$ constitute about 10 percent.

$n$ is an integer such that the melt index of the resulting copolymer is about 10.

Formula 3

$$-\left(R_1-\underset{\ominus}{R_2}\right)_n-Zn^{\oplus} \text{ or } H^{\oplus}$$

wherein $R_1$ is an olefin nucleus having from two to five carbon atoms, and; $R_2$ is an unsaturated monocarboxylic acid having from three to eight carbon atoms.

The ratio of $R_1$ to $R_2$ can be varied, however, it is preferred that $R_1$ constitute about 90 percent and $R_2$ constitute about 10 percent.

$n$ is an integer such that the melt index of the resulting copolymer is about 5.

As can be seen from Formulas 1, 2 and 3 above, this invention is adapted to utilize a wide range of polymeric mixtures. The most preferred copolymers for use in accordance with this invention are those in which $R_1$ in Formulas 1, 2 and 3 above is ethylene.

Further, in Formulas 1, 2 and 3, the use of the term "or $H^{\oplus}$" indicates that in the copolymer the cross-linking is not accomplished solely by metal ions, but instead said cross-linking utilizes both metal and hydonium ions.

The amount of cross-linking agent that is mixed with the copolymer is less than that theoretically required to react with all the acid groups in the copolymer and usually is less than 75 percent of stoichiometric equivalent of the carboxylic acid. Preferably, 15 to 60 percent, particularly 20 to 50 percent, of the stoichiometric equivalent of the carboxylic acid is used.

The most preferred cover compositions in accordance with this invention are mixtures of copolymers which are produced by the reaction of the sodium salt of methyl acrylic acid, with an olefin and the reaction of the zinc salt of methyl acrylic acid with an olefin.

As can be seen from the above-description, the cover compositions of this invention consist of mixtures of copolymers which are produced by the reaction of zinc and sodium salts of carboxylic acids with an olefinic nucleus.

With reference to the above-description of the copolymers for use in this invention, to the best of his ability the applicant has described the chemical nature of the copolymers for use in this invention, however, the applicant admits that he does not understand all the ramifications of said copolymers. In this application reference has been repeatedly made to the reaction product of an olefin and a metal salt of a carboxylic acid to produce an ionic copolymer. It is to be noted that other methods can be used to produce said copolymers. For example, an olefin can be reacted with a carboxyl containing compounds to produce a copolymer. The resulting copolymer can then be treated with a metal ion such that loose ionic bonds are formed between adjacent carboxyl groups. Ionic copolymers produced by such alternate methods are within the realm of this invention. Copolymers suitable for use in this invention are further described in U.S. Pat. No. 3,264,272, issued Aug. 2, 1966.

Preferably, the copolymers contain a number of ionic bonds to increase the hardness and stiffness of the solid mixture so produced. The composition containing the ionic bonds are thermoplastic at molding temperature, however, upon cooling the cross-linked composition has an increased hardness and toughness as compared to non-cross-linked compositions, such as polyethylene.

The ratio of the copolymers which make up this invention can be widely varied. With specific reference to the preferred sodium-zinc copolymer mixture, in accordance with the broad aspects of this invention the cover composition can comprise from about 90 to about 10 percent of the sodium copolymer and from about 10 to about 90 percent of the zinc copolymer. A more preferred range is from about 75 to about 25 percent of the sodium copolymer, and from about 25 to about 75 percent of the zinc copolymer. A most preferred range is from about 55 to about 45 percent of the sodium copolymer and from about 45 to about 55 percent zinc copolymer.

A more preferred cover composition for use in accordance with this invention is 50 percent sodium copolymer, and 50 percent zinc copolymer.

A most preferred specific composition for use in accordance with this invention is 50 percent of a copolymer produced by the reaction of the sodium salt of methyl acrylic acid with ethylene, and 50 percent of a copolymer produced by the reaction of the zinc salt methyl acrylic acid with ethylene.

As is stated above, the golf balls of the subject invention have superior cold cracking properties. That is, the polymer compositions of this invention are more resistant to cracking under severe stresses at temperatures below 32° F., with generally overall superior physical properties, as to be compared with the singular components of the mixture. To be more specific, when the sodium salt copolymer is mixed with the zinc salt copolymer to form the composition of this invention, a composite composition having senergistic cold cracking properties and other properties is achieved. To put this property in other terms, golf balls of the subject invention can be played by a golfer at lower temperatures than those having covers which are formed singularly from either the sodium of zinc salt copolymers. Likewise, the golf balls of this invention are superior from a durabiilty and coefficient of restitution point of view.

As was mentioned above, golf balls having the cover composition of the subject invention have superior high and low speed impact properties. These properties are measured by the coefficient of restitution which is generally indicative of the resiliency of the ball in question, hence indicative of the distance the ball will travel when struck with a golf club. Both the core and the cover contribute to the coefficient of restitution; however, for purposes of this invention we are concerned solely with the coefficient of restitution, which is effected by the cover material. The coefficient of restitution is generally measured by propelling a finished golf ball against a hard surface at a fixed velocity. After the ball has rebounded from the surface its velocity is again measured. The ratio of the rebound velocity over the initial velocity is the coefficient of restitution. The coefficient of restitution must be carefully controlled in all commercial golf balls in order for the ball to be within the specifications as set down by the United States Golfers Association and hence in order to be a legal ball.

With reference to the above-described United States Golf Association standards, the subject cover material is particularly advantageous in that in using this invention the golf balls with solid cores can be produced which closely approach the .785 maximum limit as imposed by the United States Golf Association. Prior to this invention this has not been possible with prior art cover material on solid core balls. In contrast when a wound core is utilized the coefficient of restitution of the core can be varied by altering the windings, the type of windings, the type of center, etc. By altering these variables it was possible in the past to closely approach the .785 figure regardless of the cover material utilized. However, when a solid core is utilized instead of a wound core the coefficient of restitution of said core depends solely on the physical properties of polymeric material from which that core is made, hence the coefficient of restitution of solid cores can not be varied as easily as those of wound cores. Accordingly, it can be seen that the increase in coefficient of restitution which is imparted by the cover material of this invention is particularly useful and advantageous when the subject cover material is used in conjunction with solid cores.

It is within the purview of this invention to add to the cover compositions of this invention compatible materials which do not affect the basic and novel characteristics of the composition of this invention. Among such materials are coloring agents, including dyes and pigments, fillers and similar additives. Additives such as antioxidants, antistatic agents, and stabilizers may also be added. The upper limit of the quantity of additives is usually about 5 weight percent of the product.

The cover material which is the subject matter of this invention is applied over a core. Cores of either the solid or wound type can be used in accordance with this invention. With reference to the wound type core a thread like material is wound either over a solid or a spherical shell which is liquid filled to produce a center. The thread like material which is wound around this small center is either in a thread or tape form. With reference to the solid core balls, these are balls wherein the core generally comprises a sphere which is formed from a resilient polymeric material. Because the core material is not an integral part of this invention it is not thought that a detailed discussion of core materials is necessary. However, it might be said that the cover material of the subject invention can be utilized in conjunction with any standard golf ball core.

The golf ball cover material of this invention can be applied to a core in any standard manner. For example, the cover material can be injected molded directly around a prepositioned core or two half shells of a cover can be formed from the cover material of this invention. These half shells are then positioned around a core and fused together in such a manner as to form a finished golf ball. Again the forming technique whereby the finished golf ball is produced is not an integral part of this invention. However, the cover composition of the subject invention can utilize any standard manufacturing technique to form finished golf balls.

The following examples will illustrate the subject invention. These examples are given for the purpose of illustration and not for purposes of limiting this invention. (All parts percent are given by weight unless otherwise specified.)

EXAMPLES

1. Four golf balls were prepared by taking solid cores and positioning said cores in an injection mold in such a manner as to be able to uniformly inject cover material around said cores. A cover material composition was prepared using a mixture of sodium and zinc ethylene ionic copolymers. For use in these examples the sodium and zinc copolymers are polymers which are produced by the polymerization of ethylene with the sodium and zinc salts of methyl acrylic acid. The resulting copolymers have loose ionic bonds between adjacent carboxyl groups. Suitable sodium copolymers are sold by the above-described E. I. du Pont de Nemours Co. under the trademark "Surlyn A 1555"; while suitable zinc copolymers are sold under the trademark "Surlyn A 1557."

A cover composition was then prepared in accordance with Table I:

TABLE I

| | Parts |
|---|---|
| Surlyn A 1555 | 50 |
| Surlyn A 1557 | 50 |
| Titanium dioxide | 2.5 |

The Surlyn A 1555 was added to the Surlyn A 1557 and mixed on a mill, the titanium dioxide was then added to this mixture. The resulting composition was then cooled and ground into pellets. These pellets were then dried thoroughly and fed into the barrel of a reciprocal screw injection molding machine. The resulting melt temperature at the nozzle prior to entry into the mold was 305° F.+5°. The material was then injected into the closed mold cavities around the cores to form the covers. After sufficient cooling the mold was opened and essentially finished golf balls removed.

The balls in question were then tested for their coefficients of restitution by propelling the balls out of a compressed air gun at an initial velocity of approximately 125 feet per second through the screens of a conograph thereby measuring accurately the initial velocity. The ball was then allowed to strike a steel plate and then rebound back through the conograph screens and the rebound velocity accurately measured. The ratio of the rebound velocity over the initial velocity is the coefficient of restitution. The average coefficient of restitution for these balls was .778.

The resulting balls were then tested for their cold cracking properties, by placing the balls for 16 hours in a freezer at approximately 6° F. The balls were then propelled out of an air gun in the manner described above at 125 feet per second against a steel plate five times in sequence. There were no failures in this grouping of balls due to repeated high speed impact at 6° F.

The balls were then tested for durability in accordance with the Barrel Test. This comprises propelling the balls out of a compressed air gun at approximately 160 to 180 feet per second in a manner as described above into an octagonal shaped barrel wherein the ball first strikes a serrated steel plate which simulates an iron face golf club, from there it is free to rebound around the barrel until its energy is spent, whereupon it is picked up and refired for a total of 100 sequences per ball. There were no failures with the subject balls.

2. Four balls were prepared and tested in accordance with Example 1, wherein the cover material comprised the sodium copolymer singularly, the above-described Surlyn A 1555; the cover composition was in accordance with Table II:

TABLE II

| | Parts |
|---|---|
| Surlyn 1555 | 100 |
| Titanium dioxide | 2.5 |

The average coefficient of restitution for these balls was .770. All four balls broke on the first impact of high speed cold temperature impact test. In the durability test there were 25 percent failures.

3. Four balls were prepared and tested in accordance with Example 1 wherein the cover material comprised the zinc copolymer singularly, the above-described Surlyn A 1557; the cover composition is in accordance with Table III:

TABLE III

| | Parts |
|---|---|
| Surlyn 1557 | 100 |
| Titanium dioxide | 2.5 |

The average coefficient of restitution for these balls was .764. There were no failure on these balls due to repeated high speed impact at cold temperatures. In the durability test there were no failures.

4. Using the procedure and composition of Example 1, four additional balls were tested for cold cracking high speed impact at −16° F. None of the test balls failed.

5. Using the procedure and composition of Example 1, four additional balls were tested for cold cracking high speed impact at −18° F. None of the test balls failed.

6. Using the procedure and composition of Example 1, four additional balls were tested for accelerated two year aging by placing the balls in a vacuum oven at 70° C. for 2 weeks. None of the balls failed the high speed cold impact test at 0° F. The coefficient of restitution was .768. None of the balls failed the durability test.

7. Using the procedure and composition of Example 2, and the aging test of Example 6, four more balls were prepared and tested. All of the balls failed the high speed cold impact test at 0° F. on the first blow. The coefficient of restitution was .752. 25 percent of the balls failed the durability test.

8. Using the procedure and composition of Example 3, and the aging test of Example 6, four more balls were prepared and tested. None of the balls failed the high speed impact test at 0° F. The coefficient of restitution was .755. None of the balls failed the durability test.

9. Twelve additional golf balls were prepared using production solid cores which were essentially the same as the cores described in Example 1. The procedure of Example 1 was used to prepare and test the balls. A cover composition was then prepared in accordance with Table IV.

TABLE IV

| | Parts |
|---|---|
| Surlyn A 1555 | 75 |
| Surlyn A 1557 | 25 |
| Titanium dioxide | 2.5 |

The average coefficient of restitution for these balls was .777. There were no failures on these balls due to repeated high speed impact at cold temperatures. In the durability test there were no failures.

10. Twelve more balls were prepared in accordance with Example 9 using a cover composition in accordance with Table V.

TABLE V

| | Parts |
|---|---|
| Surlyn A 1555 | 25 |
| Surlyn A 1557 | 75 |
| Titanium dioxide | 2.5 |

The average coefficient of restitution for these balls was .767. There were no failures on these balls due to repeated high speed impact at cold temperatures. In the durability test there were no failures.

11. Twelve more balls were prepared in accordance with Example 9 except that a wound core was utilized. The core comprised a conventional liquid center which is wound with an elastomeric thread.

The composition of the cover material was in accordance with Table I above.

The average coefficient of restitution for these balls was .776. There were no failures on these balls due to repeated high speed impact at cold temperatures. In the durability test there were no failures.

DISCUSSION OF THE EXAMPLES

It can be seen from Example No. 2 that golf balls formed having cover materials which are solely the sodium salt copolymer have definite deficiencies in the area of their cold cracking resistance and durability. In this connection the data from Examples Nos. 2 and 7 should be compared with the data of Examples 1, 4, 5 and 6 wherein it can be seen that when a mixture of the sodium and zinc salt copolymers is used in the cover material there is a drastic improvement in the cold cracking ability of the cover material. Further, when the data of Examples 1, 4, 5 and 6, which utilize a mixture of sodium and zinc salts, is compared with those examples which relate to cover materials of singular sodium or zinc salts it can be seen that there is a substantial increase in the coefficient of restitution. As a result of this increase in coefficient, a superior golf ball having maximum flight characteristics in accordance with USGA rules is produced. Likewise, the data of Examples 1 and 6 exhibit that the cover compositions of this invention have superior durability properties. Finally, the data of Example 6 illustrates that the cover compositions of this invention have superior aging properties.

What is claimed is:

1. A golf ball comprising a core and a cover, wherein said cover comprises from about 90 to about 10 percent of an ionic copolymer of an olefin having from 2 to 5 carbon atoms, and a sodium salt of an unsaturated monocarboxylic acid containing from 3 to 8 carbon atoms and from about 10 to about 90 percent of an ionic copolymer of an olefin having from 2 to 5 carbon atoms and a zinc salt of an unsaturated monocarboxylic acid containing from 2 to 8 carbon atoms.

2. The golf ball of Claim 1 wherein said cover comprises from about 75 to about 25 percent of an ethylene base sodium salt copolymer, and from about 25 to about 75 percent of an ethylene base zinc salt copolymer.

3. The golf ball of Claim 1 wherein said cover comprises from about 55 to about 45 percent of an ethylene base sodium salt copolymer and from about 45 to about 55 percent of an ethylene base zinc salt copolymer.

4. The golf ball of Claim 1 wherein said cover comprises about 50 percent of the sodium salt copolymer, and about 50 percent of the zinc salt copolymer.

5. The golf ball of Claim 1 wherein said cover comprises from about 90 to about 10 percent of a copolymer which is produced by the reaction of ethylene with the sodium salt of methyl acrylic acid, and from about 10 to about 90 percent of a copolymer which is produced by the reaction of ethylene with the zinc salt of methyl acrylic acid.

6. The golf ball of Claim 1 wherein said cover comprises from about 75 to about 25 percent of a copolymer which is produced by the reaction of ethylene with the sodium salt of methyl acrylic acid, and from about 25 to about 75 percent of a copolymer which is produced by the reaction of ethylene with the zinc salt of methyl acrylic acid.

7. The golf ball of Claim 1 wherein said cover comprises from about 55 to about 45 percent of a copolymer which is produced by the reaction of ethylene with the sodium salt of methyl acrylic acid, and from about 45 to about 55 percent of a copolymer which is produced by the reaction of ethylene with the zinc salt of methyl acrylic acid.

8. The golf ball of Claim 1 wherein said cover material comprises about 50 percent of a copolymer which is produced by the reaction of ethylene with the sodium salt of methyl acrylic acid, and about 50 percent of a copolymer which is produced by the reaction of ethylene with the zinc salt of methyl acrylic acid.

References Cited

UNITED STATES PATENTS

| | | | |
|---|---|---|---|
| 3,264,272 | 8/1966 | Rees | 260—78.5 |
| 3,454,280 | 7/1969 | Harrison et al. | 273—235 |
| 3,437,718 | 4/1969 | Rees I | 260—889 |

MURRAY TILLMAN, Primary Examiner

C. J. SECCURO, Assistant Examiner

US. Cl. X.R.

260—41 B; 273—235 R

UNITED STATES PATENT OFFICE
CERTIFICATE OF CORRECTION

PATENT NO. : 3,819,768
DATED : June 25, 1974
INVENTOR(S) : Robert P. Molitor

It is certified that error appears in the above—identified patent and that said Letters Patent are hereby corrected as shown below:

Column 2, line 34, change $Se^{+3}$ to $Ce^{+3}$.

Claim 1, line 48, change numeral 2 to numeral 3.

Signed and Sealed this

Tenth Day of August 1976

[SEAL]

Attest:

RUTH C. MASON
*Attesting Officer*

C. MARSHALL DANN
*Commissioner of Patents and Trademarks*